(12) United States Patent
Wang

(10) Patent No.: US 10,000,127 B2
(45) Date of Patent: Jun. 19, 2018

(54) PARALLEL CHARGING AND POWER SUPPLY SYSTEM FOR PURE ELECTRIC VEHICLE

(71) Applicant: ADVANCED HIGH POWER MULTI(ACT/XE) SOURCE ENERGY SCIENCE-TECH CO., LTD, Deyang, Sichuan Province (CN)

(72) Inventor: Xu Wang, Deyang (CN)

(73) Assignee: ADVANCED HIGH POWER MULTI (ACT/XE) SOURCE ENERGY SCIENCE-TECH CO., LTD. (CN)

(*) Notice: Subject to any disclaimer, the term of this patent is extended or adjusted under 35 U.S.C. 154(b) by 0 days. days.

(21) Appl. No.: 15/308,608

(22) PCT Filed: May 28, 2015

(86) PCT No.: PCT/CN2015/080099
§ 371 (c)(1),
(2) Date: Nov. 3, 2016

(87) PCT Pub. No.: WO2016/134565
PCT Pub. Date: Sep. 1, 2016

(65) Prior Publication Data
US 2017/0182897 A1    Jun. 29, 2017

(30) Foreign Application Priority Data
Feb. 26, 2015  (CN) .......................... 2015 1 0088626

(51) Int. Cl.
*B60L 11/18*    (2006.01)
*B60L 15/00*    (2006.01)

(52) U.S. Cl.
CPC ....... *B60L 11/1814* (2013.01); *B60L 11/1868* (2013.01); *B60L 15/007* (2013.01)

(58) Field of Classification Search
CPC . B60L 11/1814; B60L 11/1868; B60L 15/007
USPC .......................................................... 701/22
See application file for complete search history.

(56) References Cited

U.S. PATENT DOCUMENTS

| 2009/0171523 A1* | 7/2009 | Luo ....................... B60W 20/40 701/22 |
| 2013/0096749 A1* | 4/2013 | Hussain .................. B60K 6/46 701/22 |
| 2015/0061381 A1* | 3/2015 | Biskup .................. B60L 3/0046 307/10.1 |

(Continued)

*Primary Examiner* — Tyler J Lee
(74) *Attorney, Agent, or Firm* — PROI Intellectual Property US

(57) ABSTRACT

A parallel charging and power supply system for a battery electric vehicle comprises a battery unit, a battery management system, a vehicle control unit, a motor controller and a motor, wherein a corresponding signal output end and a signal input end of the battery management system are respectively connected with a corresponding signal input end and a signal output end of the battery unit; the motor controller is respectively connected with a power output end of the battery unit, a power input end of the motor and a signal output end of the motor; a signal input end of the vehicle control unit is respectively connected with the corresponding signal output ends of the battery management system and the motor controller.

9 Claims, 1 Drawing Sheet

(56) References Cited

U.S. PATENT DOCUMENTS

2015/0151736 A1* 6/2015 Kim .................... B60W 10/06
   701/22

* cited by examiner

PARALLEL CHARGING AND POWER SUPPLY SYSTEM FOR PURE ELECTRIC VEHICLE

CROSS REFERENCE TO RELATED APPLICATIONS

The present application is the US national stage of International Patent Application PCT/CN2015/080099 filed on May 28, 2015, which, in turn, claims priority to Chinese Patent Application CN 201510088626.7 filed on Feb. 26, 2015.

TECHNICAL FIELD

The present disclosure relates to a power supply system for a battery electric vehicle, particularly to a parallel charging and power supply system for battery electric vehicles, composed of an aluminum-air fuel battery system, a lithium ion battery pack and an energy storage system.

BACKGROUND

A battery electric vehicle is an important way for replacing the existing fuel vehicle. In order to travel for a long distance, a battery electric vehicle using lithium ion batteries as power needs to install a large number of lithium ion batteries because of the capacity limitation of lithium ion batteries, which results in a notable increase in the cost and weight of the vehicle. In addition, it is very dangerous for a vehicle to carry a large number of lithium ion batteries.

The insufficient capacity of lithium battery packs as the power of battery electric vehicles brings a series problem such as short traveling mileage, poor safety, over weight and high cost.

The characteristics of aluminum-air fuel batteries such as large capacity, high safety, environmental friendly, low price, easy to charge and so on make it available to act as an excellent power supply for the battery electric vehicle.

CONTENT OF THE INVENTION

The technical problem to be solved by the present disclosure is to provide a parallel charging and power supply system for a battery electric vehicle capable of obviously increasing the traveling mileage of the battery electric vehicles through an aluminum-air fuel battery system.

Technical proposal proposed by the present disclosure, is a parallel charging and power supply system for a battery electric vehicle, comprising a battery unit and the following components:

A battery management system, wherein the corresponding signal output end and the signal input end of the battery management system are respectively connected with the corresponding signal input end and the signal output end of the battery unit. The battery management system is used for monitoring the voltage and the current of the battery unit and realizing hybrid control on the battery unit;

A motor controller, wherein the motor controller is respectively connected with the power output end of the battery unit, the power input end and the signal output end of the motor. The motor controller is used for controlling the motor to drive the vehicle to travel according to the specified torque and rotational speed, realizing the conversion of the power supply outputted by the battery unit into the power supply required by the motor and driving the motor to output mechanical energy. Meanwhile, the motor controller also monitors the operating state of the motor at any time;

A vehicle control unit, wherein the signal input ends of the vehicle control unit are respectively connected with the corresponding signal output ends of the battery management system and the motor controller, the signal output ends of the vehicle control unit are respectively connected with the corresponding signal input ends of the battery management system and the motor controller. The vehicle control unit is used for monitoring the operating states of the battery unit and the motor, issuing control commands of the vehicle operating states to the battery management system and the motor controller by collecting the information of the acceleration pedal, the brake pedal, the gears, the vehicle speed, the temperature, the power output combined mode of the battery unit, etc; the power output combined mode can also beset by the driver;

The battery unit itself is provided with a conversion module. The conversion module is used for controlling the charging of the battery unit itself according to the commands of the battery management system. The signal input end of the conversion module is connected with the corresponding signal output end of the battery management system;

a motor, wherein the power input end of the motor is connected with the power output end of the motor controller. The motor obtains electric energy and outputs mechanical energy to drive the vehicle to travel. The signal output end of the motor is connected with the corresponding signal input end of the motor controller for transmitting the operating state information of the motor to the motor controller.

The battery unit comprises a conversion module, an aluminum-air fuel battery system, a lithium ion battery pack and an energy storage system. The aluminum-air fuel battery system, the lithium ion battery pack and the energy storage system are connected in parallel. The signal input ends and the signal output ends of the aluminum-air fuel battery system, the lithium ion battery pack and the energy storage system are respectively connected with the corresponding signal output end and the signal input end of the battery management system. The power output ends of the battery unit are connected with the corresponding power input end of the motor controller. The signal input end of the conversion module is connected with the corresponding signal output end of the battery management system. The power input end of the conversion module is connected with the corresponding power output end of the aluminum-air fuel battery system. The power output ends of the conversion module are respectively connected with the power input ends of the lithium ion battery pack and the energy storage system.

The energy storage system is a supercapacitor system.

At the same time of normally starting the battery electric vehicle, the vehicle control unit, the battery management system and the motor controller of the parallel charging and power supply system are started and the aluminum-air fuel battery system is also started accordingly the vehicle control unit issues start-related commands to the motor controller and the battery management system, the battery management system starts to monitor the power supply conditions and the energy storage conditions of the lithium ion battery pack, the aluminum-air fuel battery system and the energy storage system in real time according to the commands issued by the vehicle control unit; when the battery management system monitors that the capacity of the lithium ion battery pack is adequate, the battery management system adjusts and controls the lithium ion battery pack to directly provide the power supply for the motor, the motor controller adjusts and controls the motor to drive the vehicle in accordance with the commands issued by the vehicle control unit, at this moment, the aluminum-air fuel battery system outputs electric power to charge the energy storage system under the adjustment and control of the conversion module; if the battery management system receives a starting command with the starting power exceeding the normal starting power at this moment, the battery management system adjusts and controls the lithium ion battery pack and the energy storage system to provide the power supply together for the motor, the motor controller adjusts and controls the motor to drive the vehicle in accordance with the commands issued by the vehicle control unit; if the battery management system receives a starting command with the starting power much higher than the normal starting power, the battery management system adjusts and controls the lithium ion battery pack, the aluminum-air fuel battery system and the energy storage system to provide the power supply together for the motor, the motor controller adjusts and controls the motor to drive the vehicle in accordance with the commands issued by the vehicle control unit; when the battery management system monitors that the capacity of the lithium ion battery pack is inadequate, the battery management system controls the conversion module to adjust and control the aluminum-air fuel battery system directly providing the power supply for the motor and also charging the lithium ion battery pack with part of its electric power at the same time, the motor controller adjusts and controls the motor to drive the vehicle in accordance with the commands issued by the vehicle control unit; once the battery management system monitors that the capacity of the lithium ion battery pack charged by the aluminum-air fuel battery system reaches the rated capacity, the battery management system adjusts and controls the lithium ion battery pack again to directly provide the power supply for the motor, the motor controller adjusts and controls the motor to drive the vehicle in accordance with the commands issued by the vehicle control unit, at this moment, the aluminum-air fuel battery system outputs the power supply to charge the energy storage system under the adjustment and control of the conversion module; if the battery management system receives a starting command which is higher than the normal starting power while the battery management system also monitors that the capacity of the lithium ion battery pack is inadequate, the battery management system adjusts and controls the aluminum-air fuel battery system and the energy storage system to provide the power supply together for the motor, and the motor controller adjusts and controls the motor to drive the vehicle in accordance with the commands issued by the vehicle control unit.

When the battery electric vehicle travels on a flat road after started, the vehicle control unit issues travel-related commands to the motor controller and the battery management system, the battery management system monitors the power supply conditions and the energy storage conditions of the lithium ion battery pack, the aluminum-air fuel battery system and the energy storage system in real time according to the commands issued by the vehicle control unit. When the battery management system detects that the capacity of the lithium ion battery pack is adequate, the battery management system adjusts and controls the lithium ion battery pack to directly provide the power supply for the motor, the motor controller adjusts and controls the motor to drive the vehicle in accordance with the commands issued by the vehicle control unit, at this moment, the aluminum-air fuel battery system outputs the power supply to charge the energy storage system under the adjustment and control of the conversion module. When the battery management system detects that the capacity of the lithium ion battery pack is inadequate, the battery management system controls the conversion module to adjust and control the aluminum-air fuel battery system providing the power supply alone for the motor and charging the lithium ion battery pack with part of the output power at the same time, the motor controller adjusts and controls the motor to drive the vehicle in accordance with the commands issued by the vehicle control unit. Once the battery management system detects that the capacity of the lithium ion battery pack charged by the aluminum-air fuel battery system reaches the rated capacity, the battery management system adjusts and controls the lithium ion battery pack again to directly provide the power supply for the motor, the motor controller adjusts and controls the motor to drive the vehicle in accordance with the commands issued by the vehicle control unit, at this moment, the aluminum-air fuel battery system outputs the power supply for charging the energy storage system under the adjustment and control of the conversion module. When the vehicle travels on an up-slope road and needs high power supply, based on the commands issued by the vehicle control unit, the battery management system detects the capacities of the lithium ion battery pack, the aluminum-air fuel battery system and the energy storage system according to the required power, and adjusts and controls the lithium ion battery pack and the aluminum-air fuel battery system to provide the power supply together for the motor, or adjusts and controls the lithium ion battery pack and the energy storage system to provide the power supply together for the motor, or adjusts and controls the aluminum-air fuel battery system and the energy storage system to provide the power supply together for the motor; and the motor controller adjusts and controls the motor to drive the vehicle to travel in accordance with the commands issued by the vehicle control unit. When the vehicle needs a much higher driving power, the vehicle control unit issues the commands according to the condition of the traveling road of the vehicle, the battery management system adjusts and controls the lithium ion battery pack, the aluminum-air fuel battery system and the energy storage system to provide the power supply together for the motor, and the motor controller adjusts and controls the motor to drive the vehicle to travel in accordance with the commands issued by the vehicle control unit.

When the battery electric vehicle is braked in a traveling process while the lithium ion battery pack is individually providing the power supply for the motor to drive the vehicle before braking and the aluminum-air fuel battery system is in a state of being charging the energy storage system, based on braking commands issued by the vehicle control unit, the battery management system adjusts and controls the lithium ion battery pack to suspend the output of the power supply, the motor controller adjusts and controls the motor to stop driving the vehicle to travel in accordance with the braking commands issued by the vehicle control unit, the battery management system controls the conversion module to adjust and control the aluminum-air fuel battery system to continue to charge the energy storage system. When the battery electric vehicle is started again after braking, the vehicle control unit issues starting commands to the battery management system and the motor controller, the battery management system adjusts and controls the lithium ion battery pack to individually output the power supply for the motor again, the motor controller adjusts and controls the motor to drive the vehicle to travel in accordance with the commands issued by the vehicle control unit, and the battery management system controls the conversion module to adjust and control the aluminum-air fuel battery system to continue to charge the energy storage system.

When the battery electric vehicle is braked in a traveling process while the aluminum-air fuel battery system is individually providing the power supply for the motor to drive the vehicle before braking and the lithium ion battery pack is in the state of being charged by the aluminum-air fuel battery system at the same time, the vehicle control unit issues the braking commands to the battery management system and the motor controller, the battery management system controls the conversion module to adjust and control the aluminum-air fuel battery system stopping output power to the motor and charging the lithium ion battery pack by using the power supply, the battery management system controls the conversion module to adjust and control the lithium ion battery pack to continue to be in a charged state. When the battery electric vehicle is started again after braking, the vehicle control unit issues starting commands to the battery management system and the motor controller, the battery management system adjusts and controls the aluminum-air fuel battery system to output the power supply for the motor again, and the motor controller adjusts and controls the motor to drive the vehicle to travel in accordance with the commands issued by the vehicle control unit.

When the battery electric vehicle is braked in a traveling process while the aluminum-air fuel battery system and the lithium ion battery pack are providing the power supply for the motor together to drive the vehicle before braking, the vehicle control unit issues the braking commands to the battery management system and the motor controller, the battery management system controls the conversion module to adjust and control the aluminum-air fuel battery system stopping output power to the motor and charging the energy storage system by using the power supply, the battery management system adjusts and controls the lithium ion battery pack to suspend the output of the power supply. When the battery electric vehicle is started again after braking, the vehicle control unit issues starting commands to the battery management system and the motor controller, the battery management system adjusts and controls the aluminum-air fuel battery system and the lithium ion battery pack to output the power supply together for the motor again, and the motor controller adjusts and controls the motor to drive the vehicle to travel in accordance with the commands issued by the vehicle control unit.

When the battery electric vehicle is braked in the traveling process while the aluminum-air fuel battery system, the lithium ion battery pack and the energy storage system are providing the power supply for the motor together to drive the vehicle before braking, the vehicle control unit issues the braking commands to the battery management system and the motor controller, the battery management system controls the conversion module to adjust and control the aluminum-air fuel battery system stopping output power to the motor and charging the energy storage system by using the power supply, the battery management system adjusts and controls the lithium ion battery pack and the energy storage system to suspend the output of the power supply. When the battery electric vehicle is started again after braking, the vehicle control unit issues starting commands to the battery management system and the motor controller, the battery management system adjusts and controls the aluminum-air fuel battery system, the lithium ion battery pack and the energy storage system to output the power supply together for the motor again, and the motor controller adjusts and controls the motor to drive the vehicle to travel in accordance with the commands issued by the vehicle control unit.

When the battery electric vehicle stops traveling, the vehicle control unit issues travel stopping commands to the battery management system and the motor controller. When the vehicle control unit issues the travel stopping commands to the battery management system and the motor controller while the electric vehicle is in a state of being provided the power supply by the lithium ion battery pack and the energy storage system is being charged by the aluminum-air fuel battery system, the battery management system adjusts and controls the lithium ion battery pack and the aluminum-air fuel battery system to stop outputting the power supply based on the commands issued by the vehicle control unit, the motor controller enables the motor to stop driving the vehicle in accordance with the commands issued by the vehicle control unit, and the electric vehicle immediately stops traveling. When the vehicle control unit issues the travel stopping commands to the battery management system and the motor controller while the electric vehicle is being provided the power supply for the motor by the aluminum-air fuel battery system and the lithium ion battery pack is in a state of being charged by the aluminum-air fuel battery system, the battery management system enables the aluminum-air fuel battery system to stop outputting the power supply to the motor based on the commands issued by the vehicle control unit, the battery management system controls the conversion module to adjust and control the aluminum-air fuel battery system charging the lithium ion battery pack by using the power supply until the lithium ion battery pack reaches the rated capacity and then the aluminum-air fuel battery system stops outputting the power supply, the motor controller enables the motor to stop driving the vehicle in accordance with the commands issued by the vehicle control unit, and the electric vehicle immediately stops traveling. When the vehicle control unit issues the travel stopping commands to the battery management system and the motor controller while the electric vehicle is in a state of being provided the power supply for the motor by the aluminum-air fuel battery system and the lithium ion battery pack together, the battery management system adjusts and controls the lithium ion battery pack and the aluminum-air fuel battery system to stop outputting the power supply based on the commands issued by the vehicle control unit, the motor controller enables the motor to stop driving the vehicle in accordance with the commands issued by the vehicle control unit, and the vehicle immediately stops traveling. When the vehicle control unit issues the travel stopping commands to the battery management system and the motor controller while the electric vehicle is in a state of being provided the power supply for the motor by the aluminum-air fuel battery system, the lithium ion battery pack and the energy storage system together, the battery management system adjusts and controls the lithium ion battery pack, the aluminum-air fuel battery system and the energy storage system to stop outputting the power supply based on the commands issued by the vehicle control unit, and the motor controller enables the motor to stop driving the vehicle in accordance with the commands issued by the vehicle control unit, and the electric vehicle immediately stops traveling.

The parallel charging and power supply system for the battery electric vehicle of the present invention not only greatly increases the traveling mileage of the electric vehicle, but also possesses high safety, light weight, low price, and simple and quick charging. The parallel charging and power supply system for the battery electric vehicle of the present disclosure can also obviously increase the traveling mileage of the electric vehicle through the aluminum-air fuel battery system while greatly decreasing the capacity of the lithium ion battery pack in the electric vehicle, solving the problems of long charging time of the lithium ion batteries pack and difficult charging brought by fewer charging positions.

| | |
|---|---|
| 1: battery unit | 2: battery management system |
| 3: vehicle control unit | 4: motor controller |
| 5: aluminum-air fuel battery system | 6: lithium ion battery pack |
| 7: energy storage system | 8: conversion module |
| 9: motor | |

Concrete Executive Methods

A parallel charging and power supply system for a battery electric vehicle of the present disclosure is detailed below in combination with the embodiments and the drawings.

Figure 1:
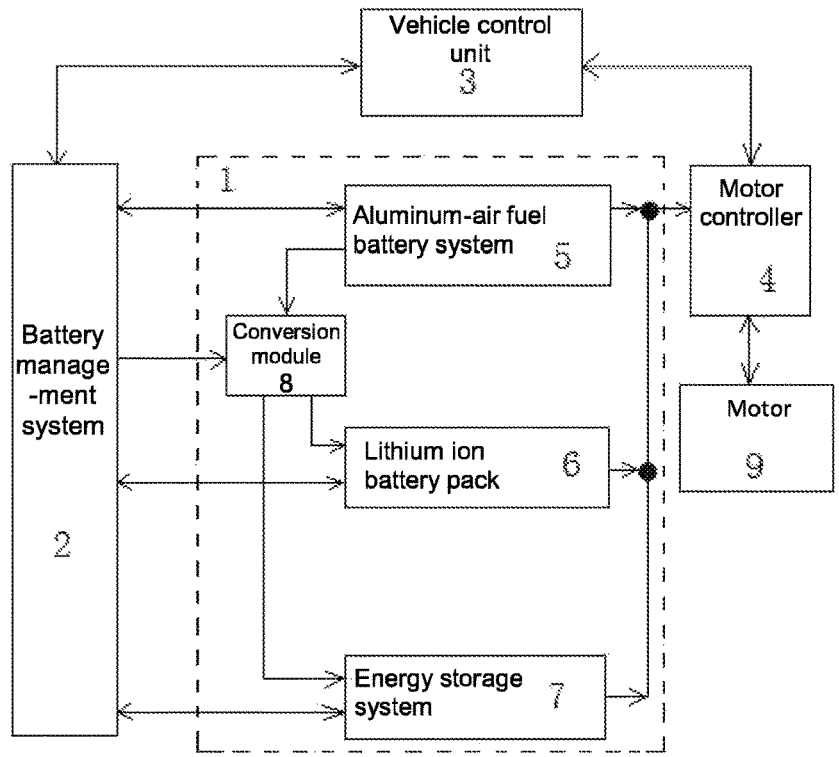
FIG. 1 is a block diagram of an overall composition of a parallel charging and power supply system for a battery electric vehicle of the present invention.

As shown in FIG. 1, a parallel charging and power supply system for a battery electric vehicle of the present disclosure comprises a battery unit 1 and is also provided with:

a battery management system 2, wherein the corresponding signal output end and the signal input end of the battery management system 2 are respectively connected with the corresponding signal input end and the signal output end of the battery unit 1. The battery management system is used for monitoring the voltage and the current of the battery unit 1 and realizing hybrid control on the battery unit 1;

a motor controller 4, wherein the motor controller 4 is respectively connected with the power output end of the battery unit 1, the power input end of the motor 9 and the signal output end of the motor 9. The motor controller is used for controlling the motor 9 to drive the vehicle to travel according to the specified torque and rotational speed, realizing the conversion of the power supply outputted by the battery unit 1 into the power supply required by the motor 9 and driving the motor 9 to output mechanical energy. Meanwhile, the motor controller 4 also monitors the operating state of the motor 9 at any time;

a vehicle control unit 3, wherein the signal input ends of the vehicle control unit 3 are respectively connected with the corresponding signal output ends of the battery management system 2 and the motor controller 4, the signal output ends of the vehicle control unit 3 are respectively connected with the corresponding signal input ends of the battery management system 2 and the motor controller 4. The vehicle control unit is used for monitoring the operating states of the battery unit 1 and the motor 9 and respectively issuing control commands of the vehicle operating states to the battery management system 2 and the motor controller 4 by collecting the information of the acceleration pedal, the brake pedal, the gears, the vehicle speed, the temperature, the power output combined mode of the battery unit 1 set by the driver etc;

a motor 9, wherein the power input end of the motor 9 is connected with the power output end of the motor controller 4 for obtaining electric energy and outputting the mechanical energy to drive the vehicle to travel. The signal output end of the motor 9 is connected with the corresponding signal input end of the motor controller 4 for transmitting the operating state information of the motor 9 to the motor controller 4.

Figure 2:
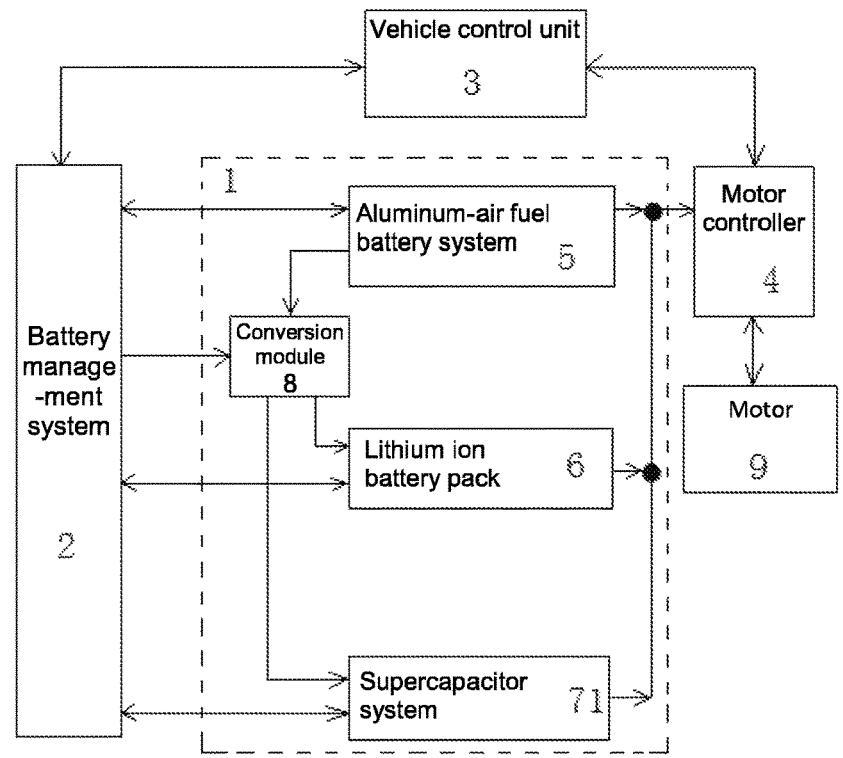
FIG. 2 is an embodiment of FIG. 1.

The battery unit 1 comprises an aluminum-air fuel battery system 5, a lithium ion battery pack 6 and an energy storage system 7. The aluminum-air fuel battery system 5, the lithium ion battery pack 6 and the energy storage system 7 are electrically connected in parallel. The signal input ends and the signal output ends of the aluminum-air fuel battery system 5, the lithium ion battery pack 6 and the energy storage system 7 are respectively connected with the corresponding signal output end and the signal input end of the battery management system 2. The power output end of the battery unit 1 is connected with the corresponding power input end of the motor controller 4. As shown in FIG. 2, the energy storage system 7 is a supercapacitor system 71.

A conversion module 8 is also arranged in the battery unit 1. The corresponding signal input end of the conversion module 8 is connected with the corresponding signal output end of the battery management system 2. The power input end of the conversion module 8 is connected with the corresponding power output end of the aluminum-air fuel battery system 5, and the power output ends of the conversion module 8 are respectively connected with the power input ends of the lithium ion battery pack 6 and the energy storage system 7. The conversion module 8 controls the aluminum-air fuel battery system 5 in the battery unit 1 to charge the lithium ion battery pack 6 or to charge the energy storage system 7 according to the commands of the battery management system 2.

In the parallel charging and power supply system for the battery electric vehicle of the present disclosure, single chip microcomputers are adopted for the battery management system 2, the vehicle control unit 3 and the motor controller 4, and the single chip microcomputers of the following models can be adopted:

| Manufacturers | Models |
|---|---|
| TI | MSP430 |
| STM | STM32F103RBT6 |
| FREESCALE | MK10DN512VLL10. |

The conversion module 8 can be selected from the following products:

1) Product with the model of LM5121 or LM5121-Q1, produced by Texas Instruments

2) Product with the model of YZCDEV-336V/15A, produced by CSIC Yuanzhou (Beijing) Science and Technology co., Ltd.

The aluminum-air fuel battery system 5 can be selected from a product with the model of STK1412 or STK1424 or STK1448, produced by Advanced High Power MULTI (ACT/XE) Source Energy Science-tech Co., LTD The lithium ion battery pack 6 can be selected from the following products:

| Companies | Models |
|---|---|
| China Aviation Lithium Battery Co., Ltd. | CA100 |
| Samsung | 45173115 |
| LG | 6164226 |
| ATL | 2614891 |
| Lishen | 2614891 |
| Bak | 2614891 |

The supercapacitor system can be selected from:
1) Products of the following models from Korean Nesscap Co., Ltd.:
① ESHSR-1200C0-002R7A5T
② ESHSR-1200C0-002R7A5
2) Products of the following models from Supreme Power Solution Co., Ltd.:
① SCP5000C0-0002R7WLZ
② SCP3000C0-0002R7WLZ
3) Products of the following models from Kaimaijiahua (Luoyang) New Energy Co., Ltd.:
① UCPY3000F
② UCPY1400F.

In a parallel charging and power supply system for a battery electric vehicle of the present disclosure, the vehicle control unit 3 is a core electronic control unit for realizing a vehicle control decision. The vehicle control unit 3 issues the control commands of the vehicle operating states to the battery management system 2 and the motor controller 4 by collecting the information of the acceleration pedal, the brake pedal, the gears, the traveling speed, the temperature, the power output combined mode among the aluminum-air fuel battery system 5, the lithium ion battery pack 6 and the energy storage system 7, etc. The power output combined mode can also be set by the driver. The motor controller 4 is used for controlling the motor 9 to drive the vehicle to travel according to the specified torque and rotational speed by receiving the vehicle traveling control commands of the vehicle control unit 3, realizing the conversion of the power supply outputted by the battery unit 1 into the power supply required by the motor 9 and driving the motor 9 to output mechanical energy. The battery management system 2 monitors the voltage and the current of the aluminum-air fuel battery system 5, the lithium ion battery pack 6 and the energy storage system 7 and realizes a hybrid control, increasing the utilization rate of the batteries, preventing the lithium ion battery pack 6 and the energy storage system 7 from overcharging and over-discharging, prolonging the service life of the battery unit 1, monitoring the state of the battery unit 1, realizing the integrated management, adjustment and control of the electric energy of the aluminum-air fuel battery system 5, the lithium ion battery pack 6 and the energy storage system 7, and realizing the communication and information exchange with the vehicle. The conversion module 8 is used for adjusting the current and the voltage of the aluminum-air fuel battery system 5, the lithium ion battery pack 6 and the energy storage system 7 for realizing the match between the aluminum-air fuel battery system 5 and the lithium ion battery pack 6 or the energy storage system 7 in the charging process.

When the battery electric vehicle adopts the parallel charging and power supply system for the battery electric vehicle of the present disclosure, the following operating states exist:

I. At the same time of normally starting the battery electric vehicle, the vehicle control unit 3, the battery management system 2 and the motor controller 4 of the parallel charging and power supply system are started and the aluminum-air fuel battery system 5 is also started accordingly, the vehicle control unit 3 issues start-related commands to the motor controller 4 and the battery management system 2, the battery management system 2 starts to monitor the power supply conditions and the energy storage conditions of the lithium ion battery pack 6, the aluminum-air fuel battery system 5 and the energy storage system 7 in real time according to the commands issued by the vehicle control unit 3. When the battery management system 2 monitors that the capacity of the lithium ion battery pack 6 is adequate, the battery management system 2 adjusts and controls the lithium ion battery pack 6 to directly provide the power supply for the motor 9, the motor controller 4 adjusts and controls the motor 9 to drive the vehicle in accordance with the commands issued by the vehicle control unit 3, at this moment, the aluminum-air fuel battery system 5 outputs the power supply to the energy storage system 7 for charging under the adjustment and control of the conversion module 8; if the battery management system 2 receives a starting command with the starting power exceeding a normal starting power, the battery management system 2 adjusts and controls the lithium ion battery pack 6 and the energy storage system 7 to provide the power supply together for the motor 9, the motor controller 4 adjusts and controls the motor 9 to drive the vehicle in accordance with the commands issued by the vehicle control unit 3; if the battery management system 2 receives a starting command with the starting power much higher than the normal starting power, the battery management system 2 adjusts and controls the lithium ion battery pack 6, the aluminum-air fuel battery system and the energy storage system 7 to provide the power supply together for the motor 9, the motor controller 4 adjusts and controls the motor 9 to drive the vehicle in accordance with the commands issued by the vehicle control unit 3. When the battery management system 2 monitors that the capacity of the lithium ion battery pack 6 is inadequate, the battery management system 2 controls the conversion module 8 to adjust and control the aluminum-air fuel battery system 5 providing the power supply directly for the motor 9 and charging the lithium ion battery pack 6 with part of the output power at the same time, the motor controller 4 adjusts and controls the motor 9 to drive the vehicle in accordance with the commands issued by the vehicle control unit 3; once the battery management system 2 monitors that the capacity of the lithium ion battery pack 6 charged by the aluminum-air fuel battery system 5 reaches the rated capacity, the battery management system 2 adjusts and controls the lithium ion battery pack 6 to directly provide the power supply for the motor 9 again, the motor controller 4 adjusts and controls the motor 9 to drive the vehicle in accordance with the commands issued by the vehicle control unit 3; if the battery management system 2 receives a starting command exceeding the normal starting power while the battery management system 2 also monitors that the capacity of the lithium ion battery pack 6 is inadequate at this moment, the battery management system 2 adjusts and controls the aluminum-air fuel battery system 5 and the energy storage system 7 to provide the power supply together for the motor 9, and the motor controller 4 adjusts and controls the motor 9 to drive the vehicle in accordance with the commands issued by the vehicle control unit 3.

II. When the battery electric vehicle travels on a flat road after started, the vehicle control unit 3 issues travel-related commands to the motor controller 4 and the battery management system 2, the battery management system 2 monitors the power supply conditions and the energy storage conditions of the lithium ion battery pack 6, the aluminum-air fuel battery system 5 and the energy storage system 7 in real time according to the commands issued by the vehicle control unit 3. When the battery management system 2 monitors that the capacity of the lithium ion battery pack 6 is adequate, the battery management system 2 adjusts and controls the lithium ion battery pack 6 to directly provide the power supply for the motor 9, the motor controller 4 adjusts and controls the motor 9 to drive the vehicle in accordance with the commands issued by the vehicle control unit 3, at this moment, the aluminum-air fuel battery system 5 outputs the power supply to charge the energy storage system 7 under the adjustment and control of the conversion module 8. When the battery management system 2 monitors that the capacity of the lithium ion battery pack 6 is inadequate, the battery management system 2 controls the conversion module 8 to adjust and control the aluminum-air fuel battery system 5 providing the power supply for the motor 9 directly and charging the lithium ion battery pack 6 with part of the output power at the same time, the motor controller 4 adjusts and controls the motor 9 to drive the vehicle in accordance with the commands issued by the vehicle control unit 3; once the battery management system 2 monitors that the capacity of the lithium ion battery pack 6 charged by the aluminum-air fuel battery system 5 reaches the rated capacity, the battery management system 2 adjusts and controls the lithium ion battery pack 6 to directly provide the power supply for the motor 9 again, the motor controller 4 adjusts and controls the motor 9 to drive the vehicle in accordance with the commands issued by the vehicle control unit 3, at this moment, the aluminum-air fuel battery system 5 outputs the power supply for charging the energy storage system 7 under the adjustment and control of the conversion module 8. When the vehicle travels on an up-slope road and needs a high power supply, based on the commands issued by the vehicle control unit 3, the battery management system 2 detects the capacities of the lithium ion battery pack 6, the aluminum-air fuel battery system 5 and the energy storage system 7 according to the required power, and adjusts and controls the lithium ion battery pack 6 and the aluminum-air fuel battery system 5 to provide the power supply together for the motor 9, or adjusts and controls the lithium ion battery pack 6 and the energy storage system 7 to provide the power supply together for the motor 9, or adjusts and controls the aluminum-air fuel battery system 5 and the energy storage system 7 to provide the power supply together for the motor 9; and the motor controller 4 adjusts and controls the motor 9 to drive the vehicle to travel in accordance with the commands issued by the vehicle control unit 3. When the vehicle needs a much higher driving power, the vehicle control unit 3 issues the commands according to the condition of the traveling road, the battery management system 2 adjusts and controls the lithium ion battery pack 6, the aluminum-air fuel battery system 5 and the energy storage system 7 to provide the power supply together for the motor 9, the motor controller 4 adjusts and controls the motor 9 to drive the vehicle to travel in accordance with the commands issued by the vehicle control unit 3.

III. When the battery electric vehicle is braked in a traveling process while the lithium ion battery pack 6 is individually providing the power supply for the motor 9 to drive the vehicle before braking and the aluminum-air fuel battery system 5 is charging the energy storage system 7, based on the braking commands issued by the vehicle control unit 3, the battery management system 2 adjusts and controls the lithium ion battery pack 6 to suspend the output of the power supply, the motor controller 4 adjusts and controls the motor 9 to stop driving the vehicle to travel in accordance with the braking commands issued by the vehicle control unit 3, the battery management system 2 controls the conversion module 8 to adjust and control the aluminum-air fuel battery system 5 to maintain the charging for the energy storage system 7. When the battery electric vehicle is started again after braking, the vehicle control unit 3 issues the starting commands to the battery management system 2 and the motor controller 4, the battery management system 2 adjusts and controls the lithium ion battery pack 6 to individually output the power supply for the motor 9 again, the motor controller 4 adjusts and controls the motor 9 to drive the vehicle to travel in accordance with the commands issued by the vehicle control unit 3, and the battery management system 2 controls the conversion module 8 to adjust and control the aluminum-air fuel battery system 5 to continue to charge the energy storage system 7.

IV. When the battery electric vehicle is braked in the traveling process while the aluminum-air fuel battery system 5 is individually providing the power supply for the motor 9 to drive the vehicle before braking and the lithium ion battery pack 6 is in the state of being charged by the aluminum-air fuel battery system 5 at the same time, the vehicle control unit 3 issues the braking commands to the battery management system 2 and the motor controller 4, the battery management system 2 controls the conversion module 8 to adjust and control the aluminum-air fuel battery system 5 stopping output power to the motor 9 and charging the lithium ion battery pack 6 by using the power supplies, the battery management system 2 controls the conversion module 8 to adjust and control the lithium ion battery pack 6 to continue to be in a charged state. When the battery electric vehicle is started again after braking, the vehicle control unit 3 issues starting commands to the battery management system 2 and the motor controller 4, the battery management system 2 adjusts and controls the aluminum-air fuel battery system 5 to output the power supply for the motor 9 again, the motor controller 4 adjusts and controls the motor 9 to drive the vehicle to travel in accordance with the commands issued by the vehicle control unit 3, and the battery management system 2 controls the conversion module 8 to adjust and control the aluminum-air fuel battery system 5 to charge the lithium ion battery pack 6 by using part of the power supply.

V. When the battery electric vehicle is braked in the traveling process while the aluminum-air fuel battery system 5 and the lithium ion battery pack 6 are providing the power supply for the motor 9 together to drive the vehicle before braking, the vehicle control unit 3 issues the braking commands to the battery management system 2 and the motor controller 4, the battery management system 2 controls the conversion module 8 to adjust and control the aluminum-air fuel battery system 5 stopping output power to the motor 9 and charging the energy storage system 7 by using the power supplies, the battery management system 2 adjusts and controls the lithium ion battery pack 6 to suspend the output of the power supply. When the battery electric vehicle is started again after braking, the vehicle control unit 3 issues starting commands to the battery management system 2 and the motor controller 4, the battery management system 2 adjusts and controls the aluminum-air fuel battery system 5 and the lithium ion battery pack 6 to output the power supply together for the motor 9 again, and the motor controller 4 adjusts and controls the motor 9 to drive the vehicle to travel in accordance with the commands issued by the vehicle control unit 3.

VI. When the battery electric vehicle is braked in the traveling process while the aluminum-air fuel battery system 5, the lithium ion battery pack 6 and the energy storage system 7 are providing the power supply for the motor 9 together to drive the vehicle before braking, the vehicle control unit 3 issues the braking commands to the battery management system 2 and the motor controller 4, the battery management system 2 controls the conversion module 8 to adjust and control the aluminum-air fuel battery system 5 stopping output power to the motor and charging the energy storage system 7 by using the electric energy, the battery management system 2 adjusts and controls the lithium ion battery pack 6 and the energy storage system 7 to suspend the output of the power supply. When the battery electric vehicle is started again after braking, the vehicle control unit 3 issues starting commands to the battery management system 2 and the motor controller 4, the battery management system 2 adjusts and controls the aluminum-air fuel battery system 5, the lithium ion battery pack 6 and the energy storage system 7 to output the power supply together for the motor 9 again, and the motor controller 4 adjusts and controls the motor 9 to drive the vehicle to travel in accordance with the commands issued by the vehicle control unit 3.

VII. When the battery electric vehicle stops traveling, the vehicle control unit 3 issues travel stopping commands to the battery management system 2 and the motor controller 4. When the vehicle control unit 3 issues the travel stopping commands to the battery management system 2 and the motor controller 4 while the electric vehicle is in the state of being powered by the lithium ion battery pack 6 alone and the energy storage system 7 is being charged by the aluminum-air fuel battery system 5, the battery management system 2 adjusts and controls the lithium ion battery pack 6 and the aluminum-air fuel battery system 5 to stop power supply based on the commands issued by the vehicle control unit 3, the motor controller 4 enables the motor 9 to stop driving the vehicle in accordance with the commands issued by the vehicle control unit 3, and the electric vehicle immediately stops traveling. When the vehicle control unit 3 issues the travel stopping commands to the battery management system 2 and the motor controller 4 while the electric vehicle is in the state of being powered alone by the aluminum-air fuel battery system 5 and the lithium ion battery pack 6 is being charged by the aluminum-air fuel battery system 5 at the same time, the battery management system 2 enables the aluminum-air fuel battery system 5 to stop outputting the power supply to the motor 9 based on the commands issued by the vehicle control unit 3, the battery management system 2 controls the conversion module 8 to adjust and control the aluminum-air fuel battery system 5 to charge the lithium ion battery pack 6 until the lithium ion battery pack breaches the rated capacity and then the aluminum-air fuel battery system 5 is completely stopped, the motor controller 4 enables the motor 9 to stop driving the vehicle in accordance with the commands issued by the vehicle control unit 3, and the electric vehicle immediately stops traveling. When the vehicle control unit 3 issues the travel stopping commands to the battery management system 2 and the motor controller 4 while the electric vehicle is in the state of being powered by the aluminum-air fuel battery system 5 and the lithium ion battery pack 6 together, the battery management system 2 adjusts and controls the lithium ion battery pack 6 and the aluminum-air fuel battery system 5 to stop the power supply based on the commands issued by the vehicle control unit 3, the motor controller 4 enables the motor 9 to stop driving the vehicle in accordance with the commands issued by the vehicle control unit 3, and the vehicle immediately stops traveling. When the vehicle control unit 3 issues the travel stopping commands to the battery management system 2 and the motor controller 4 while the electric vehicle is in the state of being powered by the aluminum-air fuel battery system 5, the lithium ion battery pack 6 and the energy storage system 7 together, the battery management system 2 adjusts and controls the lithium ion battery pack 6, the aluminum-air fuel battery system 5 and the energy storage system 7 to stop the power supply based on the commands issued by the vehicle control unit 3, and the motor controller 4 enables the motor 9 to stop driving the vehicle in accordance with the commands issued by the vehicle control unit 3, and the electric vehicle immediately stops traveling.

The parallel charging and power supply system proposed by the present disclosure, possesses the following advantages: 1) greatly increasing the traveling mileage of the battery electric vehicle; 2) high safety; 3) light weight; 4) low price; 5) simple and quick charging; 6) obviously increasing the traveling mileage of the electric vehicle through the aluminum-air fuel battery system while greatly decreasing the capacity of the lithium ion battery pack carried on the electric vehicle; 7) solving the problems in long charging time for the lithium ion batteries and difficult charging brought by fewer charging positions.

Embodiment 1: connection manners and data transmission and control manners of each part in the parallel charging and power supply system for battery electric vehicle The connection manners of each part in the parallel charging and power supply system for battery electric vehicle proposed by the present disclosure is shown in FIG. 1. The aluminum-air fuel battery system 5, the lithium ion battery pack 6 and the energy storage system 7 are connected with each other in parallel. The connected the aluminum-air fuel battery system 5, the lithium ion battery pack 6 and the energy storage system 7 are connected with the motor controller 4. The motor controller 4 is also respectively connected with the motor 9 and the vehicle control unit 3. The vehicle control unit 3 is respectively connected with the battery management system 2 and the motor controller 4. The battery management system 2 is respectively connected with the conversion module 8, the aluminum-air fuel battery system 5, the lithium ion battery pack 6 and the energy storage system 7. In addition, the conversion module 8 is not only connected with the aluminum-air fuel battery system 5, but also respectively connected with the lithium ion battery pack 6 and the energy storage system 7.

The vehicle control unit 3 issues the control commands of the vehicle operating states to the battery management system 2 and the motor controller 4 by collecting the information of the acceleration pedal, the brake pedal, the gears, the travelling speed, temperature, the power output combined mode of the battery unit 1, etc. The driver can also set the power output combined mode of the battery unit 1 for the vehicle control unit 3. The motor controller 4 is used for controlling the motor 9 to drive the vehicle to travel according to specified torque and rotational speed by receiving the vehicle traveling control commands issued by the vehicle control unit 3, realizing the conversion of the power supplies outputted by the battery unit 1 into the power supply required by the motor 9 and driving the motor 9 to output the mechanical energy to drive the vehicle. The battery management system 2 monitors the voltage and the current of the aluminum-air fuel battery system 5, the lithium ion battery pack 6 and the energy storage system 7 and issues charging-related commands to the conversion module 8, realizing hybrid control, increasing the utilization rate of the battery unit 1, preventing the battery unit 1 from overcharging and over-discharging, prolonging the service life of the battery unit 1, monitoring the state of the battery unit 1, realizing the management of the aluminum-air fuel battery system 5, the lithium ion battery pack 6 and the energy storage system 7 and the adjustment and control of the electric energy of the aluminum-air fuel battery system 5, the lithium ion battery pack 6 and the energy storage system 7, and realizing communication and information exchange with the vehicle control unit 3 and the battery unit 1. The conversion module 8 is used for adjusting the current and the voltage of the aluminum-air fuel battery system 5, the lithium ion battery pack 6 and the energy storage system 7 in accordance with the commands issued by the battery management system 2 for realizing matching in the current and the voltage of the aluminum-air fuel battery system 5 with the lithium ion battery pack 6 or with the energy storage system 7 in the charging process.

Embodiment 2: connection manners of each part in the parallel charging and power supply system with the energy storage system composed of the supercapacitor for battery electric vehicle As shown in FIG. 2, the aluminum-air fuel battery system 5, the lithium ion battery pack 6 and the supercapacitor system 71 are connected in parallel. The mutually connected three parts including the aluminum-air fuel battery system 5, the lithium ion battery pack 6 and the supercapacitor system 71 are connected with the motor controller 4. In addition, the motor controller 4 is also respectively connected with the vehicle control unit 3 and the motor 9. The vehicle control unit 3 is respectively connected with the battery management system 2 and the motor controller 4. The battery management system 2 not only is connected with the vehicle control unit 3, but also is respectively connected with the conversion module 8, the aluminum-air fuel battery system 5, the lithium ion battery pack 6 and the supercapacitor system 71. The conversion module 8 not only is connected with the aluminum-air fuel battery system 5, but also is respectively connected with the lithium ion battery pack 6 and the supercapacitor system 71.

Embodiment 3: starting manners of the battery electric vehicle equipped with the parallel charging and power supply system While the battery electric vehicle equipped with the parallel charging and power supply system shown in FIG. 1 is started, the parallel charging and power supply system is immediately started; the vehicle control unit 3, the battery management system 2 and the motor controller 4 are started; and the aluminum-air fuel battery system 5 is also started accordingly. The vehicle control unit 3 issues travel-related commands to the motor controller 4 and the battery management system 2, the battery management system 2 monitors the power supply conditions and the energy storage conditions of the lithium ion battery pack 6, the aluminum-air fuel battery system 5 and the energy storage system 7 in real time according to the commands issued by the vehicle control unit 3. When the battery management system 2 monitors that the capacity of the lithium ion battery pack 6 is adequate, the battery management system 2 adjusts and controls the lithium ion battery pack 6 to directly provide the electric energy for the motor 9, the motor controller 4 adjusts and controls the motor 9 to drive the vehicle in accordance with the commands issued by the vehicle control unit 3, at this moment, the aluminum-air fuel battery system 5 outputs the electric energy to the energy storage system 7 for charging under the adjustment and control of the conversion module 8. When the battery management system 2 monitors that the capacity of the lithium ion battery pack 6 is inadequate, the battery management system 2 controls the conversion module 8 to adjust and control the aluminum-air fuel battery system 5 to provide the electric energy for the motor 9 alone and also for charging the lithium ion battery pack 6, the motor controller 4 adjusts and controls the motor 9 to drive the vehicle in accordance with the commands issued by the vehicle control unit 3; once the battery management system 2 monitors that the capacity of the lithium ion battery pack 6 charged by the aluminum-air fuel battery system 5 reaches the rated capacity, the battery management system 2 adjusts and controls the lithium ion battery pack again to directly provide the electric energy for the motor 9, the motor controller 4 adjusts and controls the motor 9 to drive the vehicle in accordance with the commands issued by the vehicle control unit 3, at this moment, the aluminum-air fuel battery system 5 outputs the electric energy for charging the energy storage system 7 under the adjustment and control of the conversion module 8. When the vehicle is located on an up-slope road and needs high electric power to start, the battery management system 2 adjusts and controls the lithium ion battery pack 6 and the aluminum-air fuel battery system 5 to provide the electric energy together for the motor 9 based on the commands issued by the vehicle control unit 3, and the motor controller 4 adjusts and controls the motor 9 to drive the vehicle to travel in accordance with the commands issued by the vehicle control unit 3. The vehicle control unit 3 can also issue the commands to the battery management system 2 according to the condition of the traveling road of the vehicle, the battery management system 2 adjusts and controls the lithium ion battery pack 6 and the energy storage system to provide the electric energy together for the motor 9, or adjusts and controls the aluminum-air fuel battery system 5 and the energy storage system 7 to provide the electric energy together for the motor 9, or adjusts and controls the lithium ion battery pack 6, aluminum-air fuel battery system 5 and the energy storage system 7 to provide the electric energy together for the motor 9; and the motor controller 4 adjusts and controls the motor 9 to drive the vehicle to travel in accordance with the commands issued by the vehicle control unit 3.

Embodiment 4: the braking and succeeding starting manner 1 of the battery electric vehicle equipped with the parallel charging and power supply system When the battery electric vehicle equipped with the parallel charging and power supply system shown in FIG. 2 is braked in a traveling process while the lithium ion battery pack 6 is individually providing the power supply for the motor 9 to drive the vehicle and the aluminum-air fuel battery system 5 is charging the supercapacitor system 71 just before braking, based on the braking commands issued by the vehicle control unit 3, the battery management system 2 adjusts and controls the lithium ion battery pack 6 to suspend the output of the power supply, the motor controller 4 adjusts and controls the motor 9 to stop driving the vehicle to travel in accordance with the braking commands issued by the vehicle control unit 3, and the battery management system 2 controls the conversion module 8 to adjust and control the aluminum-air fuel battery system 5 to continue charging the supercapacitor system 71. When the battery electric vehicle is started again after braking, the vehicle control unit 3 issues starting commands to the battery management system 2 and the motor controller 4, the battery management system 2 adjusts and controls the lithium ion battery pack 6 to individually output the electric energy for the motor 9 again, the motor controller 4 adjusts and controls the motor 9 to drive the vehicle to travel in accordance with the commands issued by the vehicle control unit 3, and the battery management system 2 controls the conversion module 8 to adjust and control the aluminum-air fuel battery system 5 to keep charging the supercapacitor system 71.

Embodiment 5: the braking and succeeding starting manner 2 of the battery electric vehicle equipped with the parallel charging and power supply system When the battery electric vehicle equipped with the parallel charging and power supply system shown in FIG. 2 is braked in a traveling process while the aluminum-air fuel battery system 5 is individually providing the power supply for the motor 9 to drive the vehicle and the lithium ion battery pack 6 is being charged by the aluminum-air fuel battery system 5 at the same time just before braking, the vehicle control unit 3 issues the braking commands to the battery management system 2 and the motor controller 4, the motor controller 4 adjusts and controls the motor 9 to stop driving the vehicle to travel in accordance with the braking commands issued by the vehicle control unit 3, the battery management system 2 controls the conversion module 8 to adjust and control the aluminum-air fuel battery system 5 stopping output power to the motor 9 and charging the lithium ion battery pack 6 by using the power supply, and the battery management system 2 adjusts and controls the lithium ion battery pack 6 to continue to keep a charged state. When the battery electric vehicle is started again after braking, the vehicle control unit 3 issues starting commands to the battery management system 2 and the motor controller 4, the battery management system 2 adjusts and controls the aluminum-air fuel battery system 5 to individually output the electric energy for the motor 9 again the motor controller 4 adjusts and controls the motor 9 to drive the vehicle to travel in accordance with the commands issued by the vehicle control unit 3 and the battery management system 2 controls the conversion module 8 to adjust and control the aluminum-air fuel battery system 5 to charge the lithium ion battery pack 6 by using part of the output power.

Embodiment 6: the braking and succeeding starting manner 3 of the battery electric vehicle equipped with the parallel charging and power supply system When the battery electric vehicle equipped with the parallel charging and power supply system shown in FIG. 2 is braked in a traveling process while the aluminum-air fuel battery system 5 and the lithium ion battery pack 6 are providing the power supply for the motor 9 together to drive the vehicle just before braking, the vehicle control unit 3 issues the braking commands to the battery management system 2 and the motor controller 4, the battery management system 2 controls the conversion module 8 to adjust and control the aluminum-air fuel battery system 5 stopping output power to the motor 9 and charging the supercapacitor system 71 by using the power supply, and the battery management system 2 adjusts and controls the lithium ion battery pack 6 to suspend the output of the electric energy, the motor controller 4 adjusts and controls the motor 9 to stop driving the vehicle to travel in accordance with the braking commands issued by the vehicle control unit 3. When the battery electric vehicle is started again after braking, the vehicle control unit 3 issues starting commands to the battery management system 2 and the motor controller 4, the battery management system 2 adjusts and controls the aluminum-air fuel battery system 5 and the lithium ion battery pack 6 to output the electric energy together for the motor 9 again, and the motor controller 4 adjusts and controls the motor 9 to drive the vehicle to travel in accordance with the commands issued by the vehicle control unit 3.

Embodiment 7: the braking and succeeding starting manner 4 of the battery electric vehicle equipped with the parallel charging and power supply system When the battery electric vehicle equipped with the parallel charging and power supply system shown in FIG. 2 is braked in a traveling process while the aluminum-air fuel battery system 5, the lithium ion battery pack 6 and the supercapacitor system 71 are providing the power supply together for the motor 9 to drive the vehicle just before braking, the vehicle control unit 3 issues the braking commands to the battery management system 2 and the motor controller 4, the battery management system 2 controls the conversion module 8 to adjust and control the aluminum-air fuel battery system 5 stopping output power to the motor 9 and charging the supercapacitor system 71 by using the power supply, and the battery management system 2 adjusts and controls the lithium ion battery pack 6 and the supercapacitor system 71 to suspend the output of the electric energy, the motor controller 4 adjusts and controls the motor 9 to stop driving the vehicle to travel in accordance with the braking commands issued by the vehicle control unit 3. When the battery electric vehicle is started again after braking, the vehicle control unit 3 issues starting commands to the battery management system 2 and the motor controller 4, the battery management system 2 adjusts and controls the aluminum-air fuel battery system 5, the lithium ion battery pack 6 and the supercapacitor system 71 to output the electric energy together for the motor 9 again and the motor controller 4 adjusts and controls the motor 9 to drive the vehicle to travel in accordance with the commands issued by the vehicle control unit 3.

Embodiment 8: the parking manner 1 of the battery electric vehicle equipped with the parallel charging and power supply system When the battery electric vehicle equipped with the parallel charging and power supply system shown in FIG. 2 stops traveling, the vehicle control unit 3 issues travel stopping commands to the battery management system 2 and the motor controller 4. If the electric vehicle is in the state of being provided the power supply by the lithium ion battery pack 6 and charging the supercapacitor system 71 by the aluminum-air fuel battery system 5 at this moment, the battery management system 2 adjusts and controls the lithium ion battery pack 6 and the aluminum-air fuel battery system 5 to stop outputting the electric energy based on the commands issued by the vehicle control unit 3. The motor controller 4 enables the motor 9 to stop driving the vehicle in accordance with the commands issued by the vehicle control unit 3, and the electric vehicle immediately stops traveling.

Embodiment 9: the parking manner 2 of the battery electric vehicle equipped with the parallel charging and power supply system When the battery electric vehicle equipped with the parallel charging and power supply system shown in FIG. 2 stops traveling, the vehicle control unit 3 issues travel stopping commands to the battery management system 2 and the motor controller 4. If the electric vehicle is in the state of being powered by the aluminum-air fuel battery system 5 alone and the lithium ion battery pack 6 is being charged by the aluminum-air fuel battery system 5 with part of the output power at the same time, the battery management system 2 enables the aluminum-air fuel battery system 5 to stop outputting the electric energy to the motor 9 based on the commands issued by the vehicle control unit 3, but still maintains the aluminum-air fuel battery system 5 to charge the lithium ion battery pack 6 under the adjustment and control of the conversion module 8 until the lithium ion battery pack 6 reaches the rated capacity and then the aluminum-air fuel battery system 5 is completely stopped, the motor controller 4 enables the motor 9 to stop driving the vehicle in accordance with the commands issued by the vehicle control unit 3, and the electric vehicle immediately stops traveling.

Embodiment 10: the parking manner 3 of the battery electric vehicle equipped with the parallel charging and power supply system When the battery electric vehicle equipped with the parallel charging and power supply system shown in FIG. 2 stops traveling, the vehicle control unit 3 issues travel stopping commands to the battery management system 2 and the motor controller 4. If the electric vehicle is in the state of being provided the power supply for the motor 9 by the aluminum-air fuel battery system 5 and the lithium ion battery pack 6 together at this moment, the battery management system 2 adjusts and controls the lithium ion battery pack 6 and the aluminum-air fuel battery system 5 to stop outputting the electric energy based on the commands issued by the vehicle control unit 3, the motor controller 4 enables the motor 9 to stop driving the vehicle in accordance with the commands issued by the vehicle control unit 3, and the vehicle immediately stops traveling.

Embodiment 11: the parking manner 4 of the battery electric vehicle equipped with the parallel charging and power supply system When the battery electric vehicle equipped with the parallel charging and power supply system shown in FIG. 2 stops traveling, the vehicle control unit 3 issues travel stopping commands to the battery management system 2 and the motor controller 4. If the electric vehicle is in the state of being provided the power supply for the motor 9 by the aluminum-air fuel battery system 5, the lithium ion battery pack 6 and the supercapacitor system 71 together at this moment, the battery management system adjusts and controls the lithium ion battery pack 6, the aluminum-air fuel battery system 5 and the supercapacitor system 71 to stop outputting the electric energy based on the commands issued by the vehicle control unit 3, the motor controller 4 enables the motor 9 to stop driving the vehicle in accordance with the commands issued by the vehicle control unit 3, and the battery electric vehicle immediately stops traveling.

Embodiment 12: the traveling manner 1 of the battery electric vehicle equipped with the parallel charging and power supply system When the battery electric vehicle equipped with the parallel charging and power supply system shown in FIG. 2 travels on a flat road after started, the vehicle control unit 3 issues travel-related commands to the motor controller 4 and the battery management system 2 based on the traveling road condition; the battery management system 2 monitors the power supply conditions and the energy storage conditions of the lithium ion battery pack 6, the aluminum-air fuel battery system 5 and the supercapacitor system 71 in real time according to the commands issued by the vehicle control unit 3. When the battery management system 2 monitors that the capacity of the lithium ion battery pack 6 is adequate, the battery management system 2 adjusts and controls the lithium ion battery pack 6 to directly provide the electric energy for the motor 9, the motor controller 4 adjusts and controls the motor 9 to drive the vehicle in accordance with the commands issued by the vehicle control unit 3, at this moment, the aluminum-air fuel battery system 5 outputs the electric energy to the supercapacitor system 71 for charging under the adjustment and control of the conversion module 8. When the battery management system 2 monitors that the capacity of the lithium ion battery pack 6 is inadequate, the battery management system 2 controls the conversion module 8 to adjust and control the aluminum-air fuel battery system 5 providing the electric energy directly for the motor 9 and charging the lithium ion battery pack 6 with part of the output power at the same time, and the motor controller 4 adjusts and controls the motor 9 to drive the vehicle in accordance with the commands issued by the vehicle control unit 3. Once the battery management system 2 monitors that the capacity of the lithium ion battery pack 6 charged by the aluminum-air fuel battery system 5 reaches the rated capacity, the battery management system 2 adjusts and controls the lithium ion battery pack 6 to directly provide the electric energy for the motor 9 again, the motor controller 4 adjusts and controls the motor 9 to drive the vehicle in accordance with the commands issued by the vehicle control unit 3, and the battery management system 2 controls the conversion module 8 to adjust and control the aluminum-air fuel battery system 5 to output the electric energy for charging the supercapacitor system 71.

Embodiment 13: the traveling manner 2 of the battery electric vehicle equipped with the parallel charging and power supply system When the battery electric vehicle equipped with the parallel charging and power supply system shown in FIG. 2 travels on an up-slope road and needs high electric power, the vehicle control unit 3 issues related commands based on the traveling road condition. Based on the commands issued by the vehicle control unit 3, the battery management system 2 detects the capacities of the lithium ion battery pack 6, the aluminum-air fuel battery system 5 and the supercapacitor system 71 according to the required power, and adjusts and controls the lithium ion battery pack 6 and the aluminum-air fuel battery system 5 to provide the electric energy together for the motor 9, or adjusts and controls the lithium ion battery pack 6 and the supercapacitor system 71 to provide the electric energy together for the motor, or adjusts and controls the aluminum-air fuel battery system 5 and the supercapacitor system 71 to provide the electric energy together for the motor 9; and the motor controller 4 adjusts and controls the motor 9 to drive the vehicle to travel in accordance with the commands issued by the vehicle control unit 3. When the vehicle needs much higher driving power, the vehicle control unit 3 issues the commands according to the road condition of the vehicle; the battery management system 2 adjusts and controls the lithium ion battery pack 6, the aluminum-air fuel battery system 5 and the supercapacitor system 71 to provide the power supply together for the motor 9; and the motor controller 4 adjusts and controls the motor 9 to drive the vehicle to travel in accordance with the commands issued by the vehicle control unit 3.

What is claimed is:

1. A parallel charging and power supply system for a battery electric vehicle, comprising a battery unit and characterized by being also provided with:
   a battery management system, wherein corresponding signal output ends and signal input ends of the battery management system are respectively connected with the corresponding signal input ends and the signal output ends of the battery unit; the battery management system is used for monitoring voltage and current of the battery unit and realizing hybrid control on the battery unit;
   a motor controller, wherein the motor controller is respectively connected with the power output end of the battery unit, the power input end of the motor and the signal output end of the motor; the motor controller is used for controlling the motor to drive the vehicle to travel according to specified torque and rotational speed, realizing the conversion of the power supply outputted by the battery unit into the power supply required by the motor and driving the motor to output mechanical energy, and meanwhile, the motor controller also monitors the operating state of the motor at any time;

a vehicle control unit, wherein the signal input ends of the vehicle control unit are respectively connected with the corresponding signal output ends of the battery management system and the motor controller, the signal output ends of the vehicle control unit are respectively connected with the corresponding signal input ends of the battery management system and the motor controller; the vehicle control unit is used for monitoring the operating states of the battery unit and the motor, issuing the control commands of the vehicle operating states to the battery management system and the motor controller by collecting the information of an acceleration pedal, a brake pedal, gears, vehicle speed, temperature, a power output combined mode of the battery unit; the power output combined mode is set by the driver;

the battery unit itself is provided with a conversion module used for controlling the charging of the battery unit itself according to the commands of the battery management system, and a signal input end of the conversion module is connected with the corresponding signal output end of the battery management system;

a motor, wherein the power input end of the motor is connected with the power output end of the motor controller; the motor obtains electric energy from the motor controller and outputs the mechanical energy to drive the vehicle to travel; the signal output end of the motor is connected with the corresponding signal input end of the motor controller; the motor transmit the operating state information of the motor to the motor controller;

wherein the battery unit comprises a conversion module, an aluminum-air fuel battery system, a lithium ion battery pack and an energy storage system; the aluminum-air fuel battery system, the lithium ion battery pack and the energy storage system are connected in parallel; the signal input ends and the signal output ends of the aluminum-air fuel battery system, the lithium ion battery pack and the energy storage system are respectively connected with the corresponding signal output ends and the signal input ends of the battery management system; the power output end of the battery unit are connected with the corresponding power input end of the motor controller; the signal input end of the conversion module is connected with the corresponding signal output end of the battery management system; the power input end of the conversion module is connected with the corresponding power output end of the aluminum-air fuel battery system, and the power output ends of the conversion module are respectively connected with the power input ends of the lithium ion battery pack and the energy storage system.

2. The parallel charging and power supply system for the battery electric vehicle according to claim 1, which is characterized in that the energy storage system is a supercapacitor system.

3. The parallel charging and power supply system for the battery electric vehicle according to claim 1, which is characterized in that at the same time of normally starting the battery electric vehicle, the vehicle control unit, the battery management system and the motor controller of the parallel charging and power supply system are started and the aluminum-air fuel battery system is also started accordingly, the vehicle control unit issues start-related commands to the motor controller and the battery management system, the battery management system starts to monitor the power supply conditions and the energy storage conditions of the lithium ion battery pack, the aluminum-air fuel battery system and the energy storage system in real time according to the commands issued by the vehicle control unit; when the battery management system monitors that the capacity of the lithium ion battery pack is adequate, the battery management system adjusts and controls the lithium ion battery pack to directly provide the power supply for the motor, the motor controller adjusts and controls the motor to drive the vehicle in accordance with the commands issued by the vehicle control unit, at this moment, the aluminum-air fuel battery system outputs the power supply to the energy storage system for charging under the adjustment and control of the conversion module; if the battery management system receives a starting command with the starting power higher than the normal starting power, the battery management system adjusts and controls the lithium ion battery pack and the energy storage system to provide the power supply together for the motor, the motor controller adjusts and controls the motor to drive the vehicle in accordance with the commands issued by the vehicle control unit; if the battery management system receives a starting command with the starting power much higher the normal starting power, the battery management system adjusts and controls the lithium ion battery pack, the aluminum-air fuel battery system and the energy storage system to provide the power supply together for the motor, the motor controller adjusts and controls the motor to drive the vehicle in accordance with the commands issued by the vehicle control unit; when the battery management system monitors that the capacity of the lithium ion battery pack is inadequate, the battery management system controls the aluminum-air fuel battery system to directly provide the power supply for the motor while part of the output power of the aluminum-air fuel battery system is also used to charge the lithium ion battery pack under the adjustment and control of the conversion module, the motor controller adjusts and controls the motor to drive the vehicle in accordance with the commands issued by the vehicle control unit; once the battery management system monitors that the capacity of the lithium ion battery pack charged by the aluminum-air fuel battery system reaches the rated capacity, the battery management system adjusts and controls the lithium ion battery pack again to directly provide the power supply for the motor, the motor controller adjusts and controls the motor to drive the vehicle in accordance with the commands issued by the vehicle control unit, the conversion module adjusts and controls the aluminum-air fuel battery system to output the power supply for charging the energy storage system at the same time; if the battery management system receives a starting command with the starting power higher than the normal starting power and the battery management system also monitors that the capacity of the lithium ion battery pack is inadequate at the same time, the battery management system adjusts and controls the aluminum-air fuel battery system and the energy storage system to provide the power supply together for the motor, the motor controller adjusts and controls the motor to drive the vehicle in accordance with the commands issued by the vehicle control unit.

4. The parallel charging and power supply system for the battery electric vehicle according to claim 3, which is characterized in that when the battery electric vehicle travels on a level road after started, the vehicle control unit issues travel-related commands to the motor controller and the battery management system, the battery management system monitors the power supply conditions and the energy storage conditions of the lithium ion battery pack, the aluminum-air fuel battery system and the energy storage system in real time according to the commands issued by the vehicle control unit; when the battery management system monitors that the capacity of the lithium ion battery pack is adequate, the battery management system adjusts and controls the lithium ion battery pack to directly provide the power supply for the motor, the motor controller adjusts and controls the motor to drive the vehicle in accordance with the commands issued by the vehicle control unit, the conversion module adjusts and controls the aluminum-air fuel battery system to output the power supply for charging the energy storage system; when the battery management system monitors that the capacity of the lithium ion battery pack is inadequate, the battery management system controls the aluminum-air fuel battery system to directly provide the power supply for the motor, the battery management system also controls the conversion module to adjust and control the aluminum-air fuel battery system for charging the lithium ion battery pack with part of the output power of the aluminum-air fuel battery system, the motor controller adjusts and controls the motor to drive the vehicle in accordance with the commands issued by the vehicle control unit; once the battery management system monitors that the capacity of the lithium ion battery pack charged by the aluminum-air fuel battery system reaches the rated capacity, the battery management system adjusts and controls the lithium ion battery pack again to directly provide the power supply for the motor, the motor controller adjusts and controls the motor to drive the vehicle in accordance with the commands issued by the vehicle control unit, the conversion module adjusts and controls the aluminum-air fuel battery system to output the power supply for charging the energy storage system at the same time; when the vehicle travels on an up-slope road and needs high power supply, based on the commands issued by the vehicle control unit, the battery management system detects the capacities of the lithium ion battery pack, the aluminum-air fuel battery system and the energy storage system according to the required power, and adjusts and controls the lithium ion battery pack and the aluminum-air fuel battery system to provide the power supply together for the motor, or adjusts and controls the lithium ion battery pack and the energy storage system to provide the power supply together for the motor, or adjusts and controls the aluminum-air fuel battery system and the energy storage system to provide the power supply together for the motor, and the motor controller adjusts and controls the motor to drive the vehicle to travel in accordance with the commands issued by the vehicle control unit; when the vehicle needs a much higher driving power, the vehicle control unit issues the commands according to the condition of the traveling road of the vehicle, the battery management system adjusts and controls the lithium ion battery pack, the aluminum-air fuel battery system and the energy storage system to provide the power supply together for the motor, and the motor controller adjusts and controls the motor to drive the vehicle to travel in accordance with the commands issued by the vehicle control unit.

5. The parallel charging and power supply system for the battery electric vehicle according to claim 3, which is characterized in that when the battery electric vehicle is braked in a traveling process while the lithium ion battery pack is individually providing the power supply for the motor to drive the vehicle before braking and the aluminum-air fuel battery system is being in a state of charging the energy storage system, based on the braking commands issued by the vehicle control unit, the battery management system adjusts and controls the lithium ion battery pack to suspend the output of the power supply, the motor controller adjusts and controls the motor to stop driving the vehicle to travel in accordance with the braking commands issued by the vehicle control unit, the battery management system controls the conversion module to adjust and control the aluminum-air fuel battery system to continue charging the energy storage system; when the battery electric vehicle is started again after braking, the vehicle control unit issues starting commands to the battery management system and the motor controller, the battery management system adjusts and controls the lithium ion battery pack to individually output the power supply for the motor again, the motor controller adjusts and controls the motor to drive the vehicle to travel in accordance with the commands issued by the vehicle control unit, the battery management system controls the conversion module to adjust and control the aluminum-air fuel battery system to continue charging the energy storage system.

6. The parallel charging and power supply system for the battery electric vehicle according to claim 3, which is characterized in that when the battery electric vehicle is braked in the traveling process while the aluminum-air fuel battery system is individually providing the power supply for the motor to drive the vehicle before braking and the lithium ion battery pack is being in the state of being charged by the aluminum-air fuel battery system at the same time, the vehicle control unit issues the braking commands to the battery management system and the motor controller, the battery management system controls the conversion module to adjust and control the aluminum-air fuel battery system to stop outputting power to the motor, the battery management system controls the conversion module to adjust and control the lithium ion battery pack to continue being charged by the aluminum-air fuel battery system; when the battery electric vehicle is started again after braking, the vehicle control unit issues starting commands to the battery management system and the motor controller, the battery management system adjusts and controls the aluminum-air fuel battery system to output the power supply for the motor again; and the motor controller adjusts and controls the motor to drive the vehicle to travel in accordance with the commands issued by the vehicle control unit.

7. The parallel charging and power supply system for the battery electric vehicle according to claim 3, which is characterized in that when the battery electric vehicle is braked in the traveling process while the aluminum-air fuel battery system and the lithium ion battery pack is providing the power supply for the motor together to drive the vehicle before braking, the vehicle control unit issues the braking commands to the battery management system and the motor controller, the battery management system controls the conversion module to adjust and control the aluminum-air fuel battery system to charge the energy storage system, the battery management system adjusts and controls the lithium ion battery pack to suspend the output of the power supply; when the battery electric vehicle is started again after braking, the vehicle control unit issues starting commands to the battery management system and the motor controller, the battery management system adjusts and controls the aluminum-air fuel battery system and the lithium ion battery pack to output the power supply together for the motor again, and the motor controller adjusts and controls the motor to drive the vehicle to travel in accordance with the commands issued by the vehicle control unit.

8. The parallel charging and power supply system for the battery electric vehicle according to claim 3, which is characterized in that when the battery electric vehicle is braked in the traveling process while the aluminum-air fuel battery system, the lithium ion battery pack and the energy storage system is providing the power supply for the motor together to drive the vehicle before braking, the vehicle control unit issues the braking commands to the battery management system and the motor controller, the battery management system controls the conversion module to adjust and control the aluminum-air fuel battery system to charge the energy storage system, the battery management system adjusts and controls the lithium ion battery pack and the energy storage system to suspend the output of the power supply; when the battery electric vehicle is started again after braking, the vehicle control unit issues starting commands to the battery management system and the motor controller, the battery management system adjusts and controls the aluminum-air fuel battery system, the lithium ion battery pack and the energy storage system to output the power supply together for the motor again, and the motor controller adjusts and controls the motor to drive the vehicle to travel in accordance with the commands issued by the vehicle control unit.

9. The parallel charging and power supply system for the battery electric vehicle according to claim 3, which is characterized in that when the battery electric vehicle stops traveling, the vehicle control unit issues travel stopping commands to the battery management system and the motor controller; when the vehicle control unit issues the travel stopping commands to the battery management system and the motor controller while the electric vehicle is being in a state of being provided the power supply alone by the lithium ion battery pack and the energy storage system is being charged by the aluminum-air fuel battery system, the battery management system adjusts and controls the lithium ion battery pack and the aluminum-air fuel battery system to stop outputting the power supply based on the stopping commands issued by the vehicle control unit, the motor controller enables the motor to stop driving the vehicle in accordance with the commands issued by the vehicle control unit, and the electric vehicle immediately stops traveling; when the vehicle control unit issues the travel stopping commands to the battery management system and the motor controller while the electric vehicle is being in a state of being powered alone by the aluminum-air fuel battery system and the lithium ion battery pack is being charged by the aluminum-air fuel battery system, the battery management system enables the aluminum-air fuel battery system to stop outputting the power supply to the motor based on the commands issued by the vehicle control unit, the battery management system controls the conversion module to adjust and control the aluminum-air fuel battery system to charge the lithium ion battery pack until the output power of the lithium ion battery pack reaches the rated capacity and then the aluminum-air fuel battery system is completely stopped, the motor controller enables the motor to stop driving the vehicle in accordance with the commands issued by the vehicle control unit, and the electric vehicle immediately stops traveling; when the vehicle control unit issues the travel stopping commands to the battery management system and the motor controller while the electric vehicle is being in a state of being provided the power supply for the motor by the aluminum-air fuel battery system and the lithium ion battery pack together, the battery management system adjusts and controls the lithium ion battery pack and the aluminum-air fuel battery system to stop outputting the power supply based on the commands issued by the vehicle control unit, the motor controller enables the motor to stop driving the vehicle in accordance with the commands issued by the vehicle control unit, and the vehicle immediately stops traveling; when the vehicle control unit issues the travel stopping commands to the battery management system and the motor controller while the electric vehicle is being in a state of being provided the power supply for the motor by the aluminum-air fuel battery system, the lithium ion battery pack and the energy storage system together, the battery management system adjusts and controls the lithium ion battery pack, the aluminum-air fuel battery system and the energy storage system to stop outputting the power supply based on the commands issued by the vehicle control unit, and the motor controller enables the motor to stop driving the vehicle in accordance with the commands issued by the vehicle control unit, and the electric vehicle immediately stops traveling.

* * * * *